US009688275B2

(12) United States Patent
Kawasaki et al.

(10) Patent No.: US 9,688,275 B2
(45) Date of Patent: Jun. 27, 2017

(54) TRAVEL LANE MARKING RECOGNITION APPARATUS (71) Applicant: DENSO CORPORATION, Kariya, Aichi-pref. (JP)

(72) Inventors: Naoki Kawasaki, Kariya (JP); Tomohiko Tsuruta, Aichi-ken (JP); Shunsuke Suzuki, Kariya (JP); Tatsuru Kuwabara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 42 days.

(21) Appl. No.: 14/945,116

(22) Filed: Nov. 18, 2015

(65) Prior Publication Data
US 2016/0137202 A1 May 19, 2016

(30) Foreign Application Priority Data
Nov. 19, 2014 (JP) .................................. 2014-234663

(51) Int. Cl.
*G06K 9/00* (2006.01)
*B60W 30/12* (2006.01)
*G06T 7/13* (2017.01)

(52) U.S. Cl.
CPC ......... *B60W 30/12* (2013.01); *G06K 9/00798* (2013.01); *G06T 7/13* (2017.01); *B60W 2420/42* (2013.01); *G06T 2207/30256* (2013.01)

(58) Field of Classification Search
CPC .. G06K 9/00791; G06K 9/00798; G06T 7/13; G06T 7/136; G06T 7/143; G06T 2207/30256; B60W 2420/42; G05D 1/0246; G08G 1/167
See application file for complete search history.

(56) References Cited

U.S. PATENT DOCUMENTS

2009/0201370 A1* 8/2009 Otsuka et al. ................ 348/148
2014/0118552 A1* 5/2014 Takahama et al. G06K 9/00798
348/148

FOREIGN PATENT DOCUMENTS

| JP | H09-35198 A | 2/1997 | ............... G08G 1/16 |
| JP | H11-053551 A | 2/1999 | |
| JP | 2007-241470 A | 9/2007 | ............. G06T 11/60 |

* cited by examiner

Primary Examiner — Andrew W Johns
(74) Attorney, Agent, or Firm — Knobbe, Martens, Olson & Bear, LLP (57) ABSTRACT A travel lane marking probability calculating unit calculates a travel lane marking probability of each of travel lane marking candidates based on a calculation condition. A travel lane marking recognizing unit recognizes, as a travel lane marking, a travel lane marking candidate having a travel lane marking probability that is a threshold value or higher, among the travel lane marking candidates. A lane change detecting unit detects that an own vehicle is in the midst of a lane change. When the own vehicle is in the midst of a lane change, a condition changing unit changes the calculation condition to allow the travel lane marking probability to be more easily increased compared to when the own vehicle is not in the midst of a lane change, or changes the threshold value to be lower than that when the own vehicle is not in the midst of a lane change.

17 Claims, 7 Drawing Sheets

TRAVEL LANE MARKING RECOGNITION APPARATUS

CROSS-REFERENCE TO RELATED APPLICATION

This application is based on and claims the benefit of priority from Japanese Patent Application No. 2014-234663, filed Nov. 19, 2014. The entire disclosure of the above application is incorporated herein by reference.

BACKGROUND

Technical Field

The present disclosure relates to a travel lane marking recognition apparatus.

Related Art

A travel lane marking recognition apparatus is conventionally known that recognizes a travel lane marking in the following manner. First, the travel lane marking recognition apparatus generates an image by imaging the area ahead of the own vehicle, and extracts edge points from the image. Next, the travel lane marking recognition apparatus detects travel lane marking candidates based on the edge points. Furthermore, the travel lane marking recognition apparatus recognizes, as the travel lane marking, a travel lane marking candidate that has a high probability (likelihood) of being a travel lane marking, among the travel lane marking candidates (refer to JP-A-H11-53551).

When the own vehicle is in the midst of changing lanes to an adjacent lane from the lane in which the own vehicle is traveling, of the travel lane markings of the adjacent lane, the travel lane marking on the far-side of the own vehicle appears in the peripheral portion of the image. In addition, when the own vehicle is in the midst of changing lanes, the positions of the travel lane markings in the image significantly change over time. Therefore, when the own vehicle is in the midst of changing lanes, recognition of the travel lane marking at an early stage becomes difficult.

SUMMARY

It is thus desired to provide a travel lane marking recognition apparatus that can easily recognize a travel lane marking even during lane change.

An exemplary embodiment provides a travel lane marking recognition apparatus that is mounted to an own vehicle. The travel lane marking recognition apparatus includes: an imaging unit that images an area ahead of the own vehicle to generate an image of the area; an edge point extracting unit that extracts edge points from the image; a travel lane marking candidate detecting unit that detects travel lane marking candidates based on the edge points; a travel lane marking probability calculating unit that calculates a travel lane marking probability of each of the travel lane marking candidates based on a predetermined calculation condition; a travel lane marking recognizing unit that recognizes, as a travel lane marking, a travel lane marking candidate having a travel lane marking probability that is a predetermined threshold value or higher, among the travel lane marking candidates; a lane change detecting unit that detects that the own vehicle is in the midst of a lane change; and a condition changing unit that, when the own vehicle is in the midst of a lane change, (a) changes the predetermined calculation condition of the travel lane marking probability to allow the travel lane marking probability to be more easily increased compared to that when the own vehicle is not in the midst of a lane change, or (b) changes the threshold value to be lower than that when the own vehicle is not in the midst of a lane change.

According to the exemplary embodiment, the travel lane marking recognition can recognize a travel lane marking at an early stage, even during lane change.

DESCRIPTION OF THE EMBODIMENTS

Embodiments of the present disclosure will be described with reference to the drawings.

First Embodiment

1. Configuration

Figure 1:
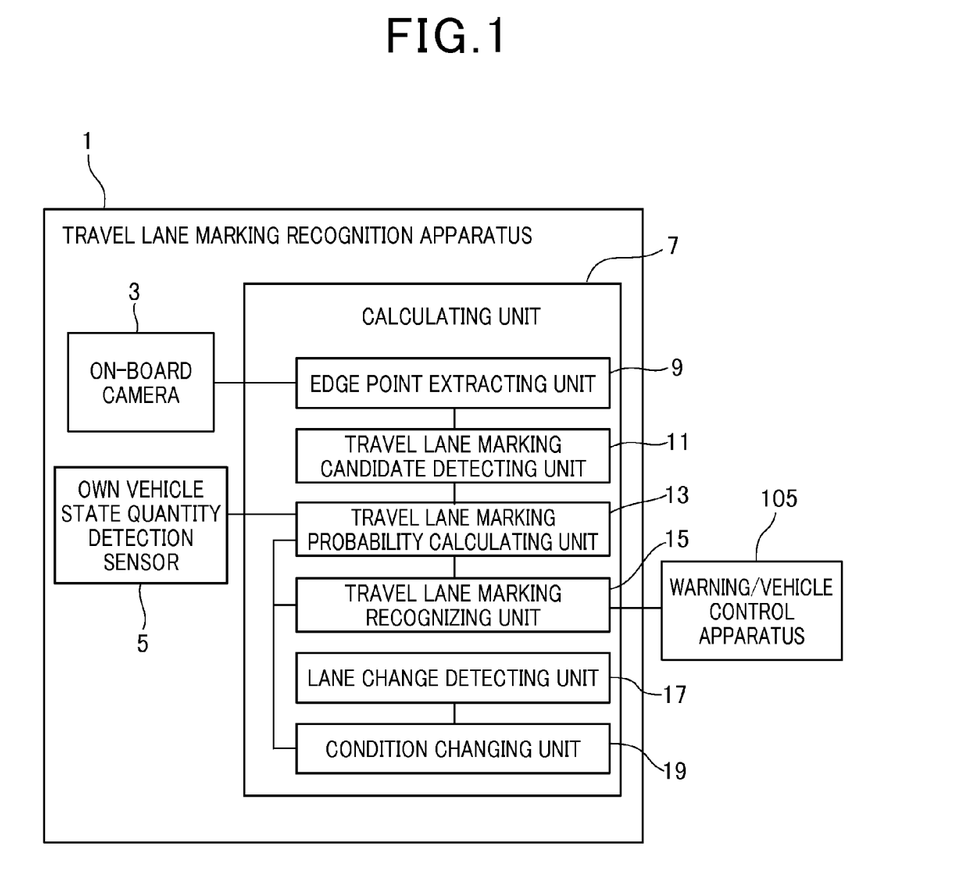
FIG. 1 is a block diagram of a configuration of a travel lane marking recognition apparatus according to a first embodiment.
Figure 2A:
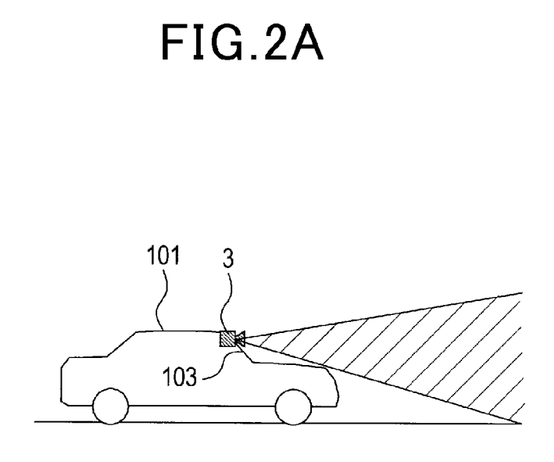
FIG. 2A is a side view of the position of an on-board camera on an own vehicle.
Figure 2B:
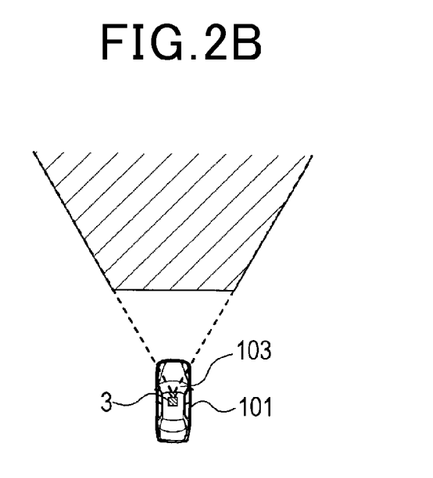
FIG. 2B is a bird's eye view of the position of the on-board camera on the own vehicle.

A configuration of a travel lane marking recognition apparatus 1 according to a first embodiment will be described with reference to FIG. 1 and FIG. 2.

The travel lane marking recognition apparatus 1 is an on-board apparatus that is mounted in a vehicle. The vehicle in which the travel lane marking recognition apparatus 1 is mounted is hereinafter referred to as an own vehicle. As shown in FIG. 1, the travel lane marking recognition apparatus 1 includes an on-board camera 3, an own vehicle state quantity detection sensor 5, and a calculating unit 7.

The on-board camera 3 is an example of an imaging unit. As shown in FIG. 2A and FIG. 2B, the on-board camera 3 is attached to an upper portion of a front windshield 103 of an own vehicle 101. The on-board camera 3 images the area ahead of the own vehicle 101 and generates an image of the area. The road ahead of the own vehicle 101 is included in the angle of view (field of view) of the generated image. The image generated by the on-board camera 3 is outputted to the calculating unit 7.

The on-board camera 3 repeatedly generates a single image every predetermined amount of time. The single image may be hereinafter referred to as a single frame. When the on-board camera 3 successively generates frames $F_1$, $F_2$, $F_3$ ..., $F_i$, $F_{i+1}$ ..., frame $F_i$ is one frame before frame $F_{i+1}$.

The own vehicle state quantity detection sensor 5 detects the vehicle speed and yaw rate of the own vehicle, and outputs the detection results to the calculating unit 7. The calculating unit 7 is a known computer that includes a central processing unit (CPU), a random access memory (RAM), a read-only memory (ROM), and the like. The calculating unit 7 performs processes described hereafter by running programs stored in the ROM. The calculating unit 7 functionally includes an edge point extracting unit 9, a travel lane marking candidate detecting unit 11, a travel lane marking probability calculating unit 13, a travel lane marking recognizing unit 15, a lane change detecting unit 17, and a condition changing unit 19. The processes performed by the units will be described hereafter.

In addition to the travel lane marking recognition apparatus 1, the own vehicle includes a warning/vehicle control apparatus 105. The warning/vehicle control apparatus 105 issues warnings and performs vehicle control based on travel lane marking parameters outputted by the travel lane marking recognition apparatus 1. Details will be described hereafter.

2. Travel Lane Marking Recognition Process

The travel lane marking recognition process performed by the travel lane marking recognition apparatus 1 will be described with reference to FIG. 3 to FIG. 6.

Figure 3:
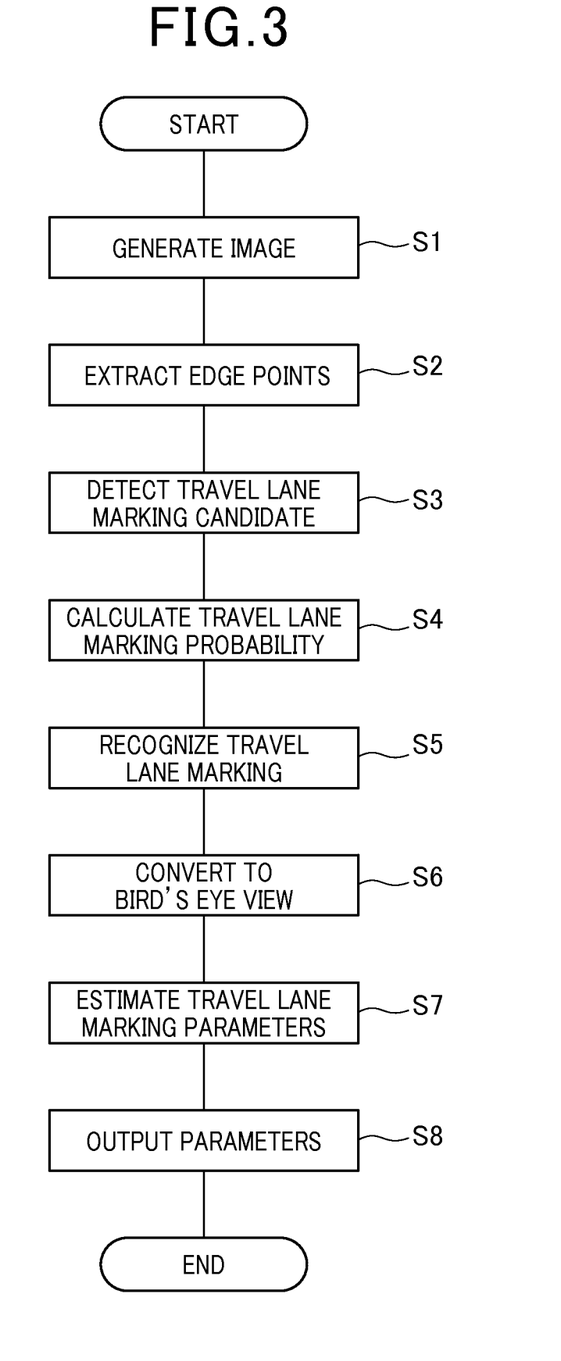
FIG. 3 is a flowchart of a travel lane marking recognition process performed by the travel lane marking recognition apparatus.

The travel lane marking recognition process is repeatedly performed every predetermined amount of time while the own vehicle is traveling.

Figure 4:
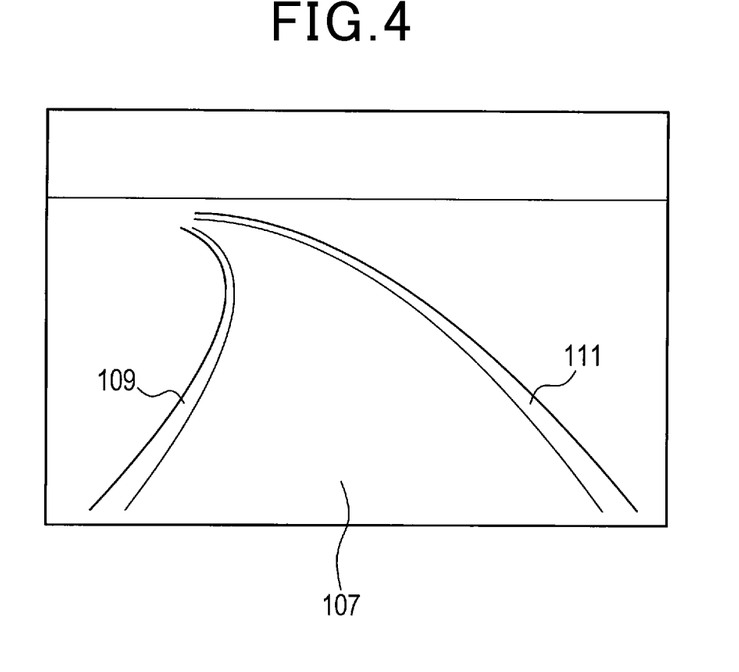
FIG. 4 is an explanatory diagram of an example of an image generated by the on-board camera.

At step S1 in FIG. 3, the on-board camera 3 images the area ahead of the own vehicle and generates an image (a single frame). An example of the image is shown in FIG. 4. The image includes a road surface 107 ahead of the own vehicle and travel lane markings 109 and 111 that demarcate the lane in which the own vehicle is traveling.

Figure 5:
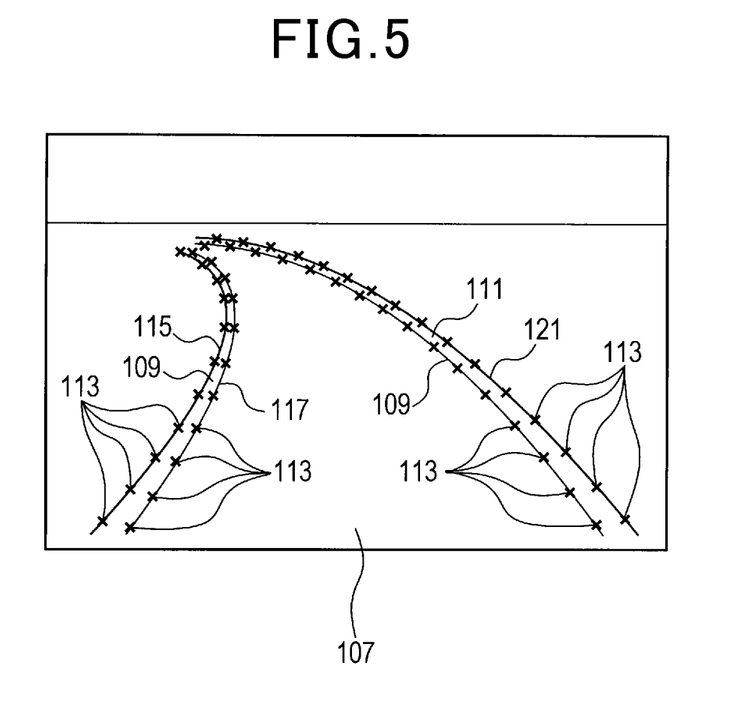
FIG. 5 is an explanatory diagram of edge points and travel lane marking candidates.

Returning to FIG. 3, at step S2, the edge point extracting unit 9 extracts edge points from the image generated at step S1. An edge point refers to a pixel of which the difference in luminance value compared to an adjacent pixel is greater than a value serving as reference. FIG. 5 shows edge points 113 extracted from the image shown in FIG. 4. The edge points 113 are present on the left-side boundaries and the right-side boundaries of the travel lane markings 109 and 111.

Returning to FIG. 3, at step S3, the travel lane marking candidate detecting unit 11 detects a travel lane marking candidate based on the edge points extracted at step S2. Specifically, straight line detection is performed on the edge points by Hough transform. A straight line that has the most votes in a voting space for Hough transform is detected as a travel lane marking candidate. FIG. 5 shows examples of detected travel lane marking candidates 115, 117, 119, and 121.

A result obtained by straight-line fitting being performed on the edge points by the least square method may also be set as a travel lane marking candidate. In addition, the travel lane marking candidate may be robustly detected by a combination of Hough transform and the least square method in such a way as to, e.g., i) set a straight line determined by the least square method as an initial straight line, ii) perform straight line detection by Hough transform using only edge points of which the deviation from the initial straight line (distance to the straight line) is a predetermined threshold value or lower, and iii) then set the result of the straight line detection as a final travel lane marking candidate.

At step S4, the travel lane marking probability calculating unit 13 calculates a travel lane marking probability (likelihood) that the travel lane marking candidate detected at step S3 configures a travel lane marking. Specifically, the travel lane marking probability calculating unit 13 performs calculation in the following manner.

First, the travel lane marking probability calculating unit 13 retrieves a frame (hereinafter referred to as a previous frame) that is one frame before the frame (hereinafter referred to as a current frame) being used in the current travel lane marking recognition process. Next, the travel lane marking probability calculating unit 13 corrects the position of the travel lane marking candidate detected in the previous frame to the position in which the travel lane marking candidate should appear in the current frame.

In other words, the own vehicle has been moving from the time of generation of the previous frame to the time of generation of the current frame. Therefore, when the travel lane marking candidate detected in the previous frame appears in the current frame, the position of the travel lane marking candidate in the current frame should be displaced from the position in the previous frame by the amount of movement of the own vehicle.

Therefore, the travel lane marking probability calculating unit 13 calculates the movement amount and the movement direction of the own vehicle from the time of generation of the previous frame to the time of generation of the current frame. Based on the calculation results, the travel lane marking probability calculating unit 13 corrects the position of the travel lane marking candidate detected in the previous frame to the position in which the travel lane marking candidate should appear in the current frame. The movement amount and the movement direction of the own vehicle can be detected by the own vehicle state quantity detection sensor 5. When a plurality of travel lane marking candidates are detected in the previous frame, each travel lane marking candidate is corrected in the manner described above.

Figure 6:
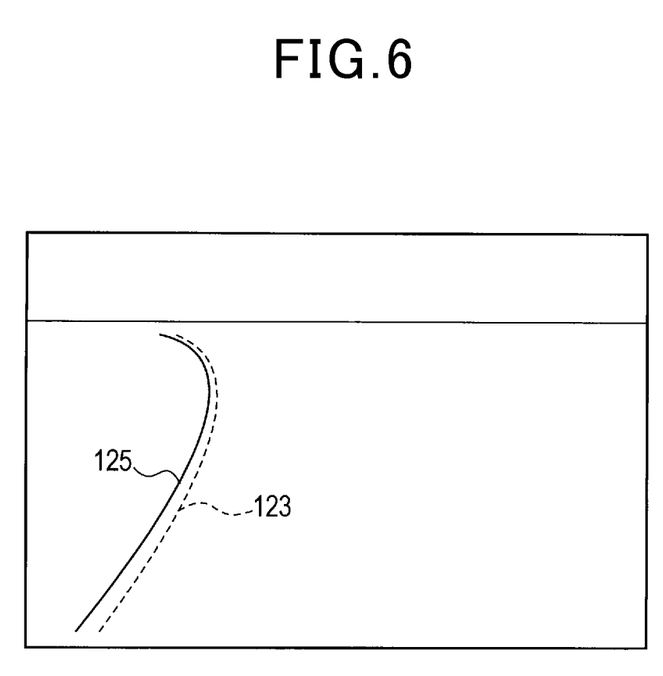
FIG. 6 is an explanatory diagram of a travel lane marking candidate detected in a previous frame and a travel lane marking candidate detected in a current frame.

FIG. 6 shows a travel lane marking candidate 123 detected in the previous frame, after position correction has been performed as described above. In addition, FIG. 6 also shows a travel lane marking candidate 125 detected in the current frame. The travel lane marking probability calculating unit 13 calculates the amount of displacement between the position of the travel lane marking candidate 125 detected in the current frame and the position of the travel lane marking candidate 123 closest to the travel lane marking candidate 125. When the amount of displacement between the positions of the travel lane marking candidate 123 and the travel lane marking candidate 125 is a predetermined reference value X or lower, a state in which the displacement of the position of the travel lane marking candidate is the reference value X or lower is at least continuous over two frames, that is, the previous frame and the current frame.

In addition, should the displacement of the position of the travel lane marking candidate be the reference value X or lower over the previous frame and the frame before the previous frame, as well, the state in which the displacement of the position of the travel lane marking candidate is the reference value X or lower is continuous over three consecutive frames.

As described above, at present step S4, the travel lane marking probability calculating unit 13 calculates the number of frames (hereinafter referred to as the number of consecutive frames) over which the state in which the displacement of the position of the travel lane marking candidate is the reference value X or lower is continuous, from past frames to the current frame. As the number of consecutive frames increases, the travel lane marking probability calculating unit 13 sets the travel lane marking probability of the corresponding travel lane marking candidate to a higher value. A large number of consecutive frames indicates that the same travel lane marking candidate is being continuously detected. Therefore, the probability that the travel lane marking candidate is a travel lane marking is high.

At step S5, the travel lane marking recognizing unit 15 recognizes, as the travel lane marking, the travel lane marking candidate of which the travel lane marking probability calculated at step S4 is a predetermined threshold value Y or higher, among the travel lane marking candidates detected at step S3.

At step S6, the travel lane marking recognizing unit 15 converts the image of the travel lane marking recognized at step S5 to a bird's eye view (converts the image to an image seen from a virtual view point above the own vehicle). The image obtained after conversion to the bird's eye view is hereinafter referred to as a bird's eye view image.

At step S7, the travel lane marking recognizing unit 15 estimates travel lane marking parameters from the bird's eye view image generated at step S6. The travel lane marking parameters include offset (the position of the own vehicle in relation to the travel lane marking, in the vehicle width direction), the yaw angle of the own vehicle in relation to the travel lane marking, the curvature of the travel lane marking, and the like.

At step S8, the travel lane marking recognizing unit 15 outputs the travel lane marking parameters estimated at step S7 to the warning/vehicle control apparatus 105.

The warning/vehicle control apparatus 105 performs the following processes, for example, using the travel lane marking parameters. The warning/vehicle control apparatus 105 determines whether or not the own vehicle is in a state in which the own vehicle there is risk of deviation from the lane in which the own vehicle is traveling, based on the travel lane marking parameters (for example, a state in which the distance between the own vehicle and the travel lane marking is short, or a state in which the yaw angle is large). When determined that the own vehicle is in such a state, the warning/vehicle control apparatus 105 issues a warning or performs vehicle control (such as automatic steering or automatic braking) to prevent deviation from the lane.

3. Condition Change Process

A condition change process repeatedly performed every predetermined amount of time by the travel lane marking recognition apparatus 1 will be described with reference to FIG. 7 and FIG. 8.

Figure 7:
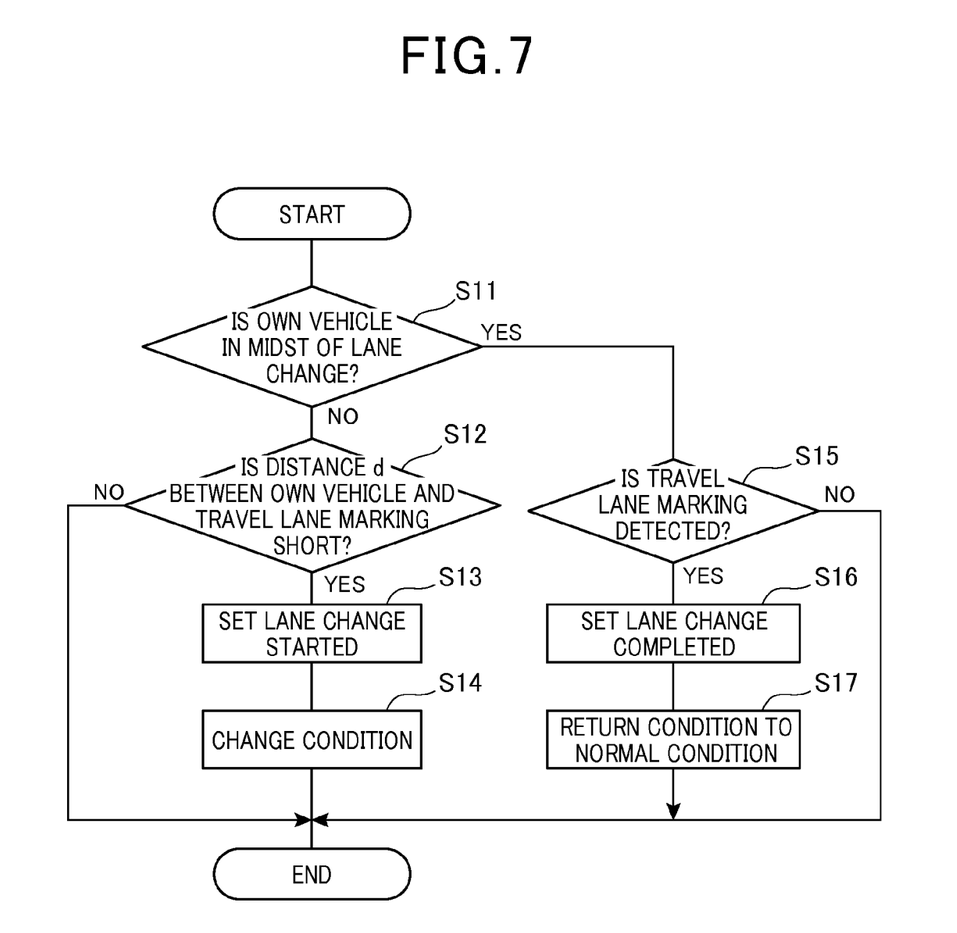
FIG. 7 is a flowchart of a condition change process performed by the travel lane marking recognition apparatus.
Figure 8:
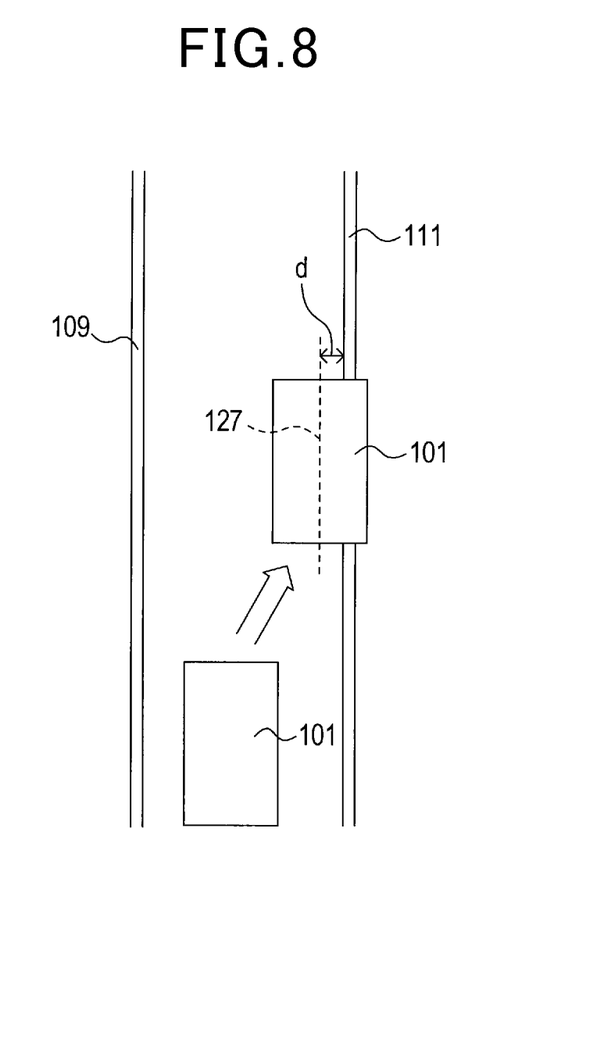
FIG. 8 is an explanatory diagram of a distance between a reference line and a travel lane marking in a vehicle width direction.

At step S11 in FIG. 7, the lane change detecting unit 17 determines whether or not the own vehicle is in the midst of a lane change. The own vehicle being in the midst of a lane change refers to a state in which "lane change started" is set at step S13, described hereafter, and "lane change completed" at step S16, described hereafter, is not yet set. In addition, a state in which the own vehicle is not in the midst of a lane change refers to a state in which "lane change started" has not been set even once at step S13, or "lane change completed" is set at step S16, described hereafter, and "lane change started" has not yet been set thereafter.

When the own vehicle is not in the midst of a lane change, the lane change detecting unit 17 proceeds to step S12. When the own vehicle is in the midst of a lane change, the lane change detecting unit 17 proceeds to step S15.

At step S12, the lane change detecting unit 17 calculates a distance d in the vehicle width direction between a straight line (hereinafter referred to as a reference line 127) that passes through the center of the own vehicle 101 and is parallel to the front/rear direction of the own vehicle, and the travel lane marking 111 closest to the own vehicle 101 (see FIG. 8). The image generated by the on-board camera 3 and the travel lane marking recognized in the image can be used for the calculation of the distance d. The lane change detecting unit 17 determines whether or not the distance d is less than a lower limit value Z set in advance. When determined that the distance d is less than the lower limit value Z, the lane change detecting unit 17 proceeds to step S13. When determined that the distance d is the lower limit value or greater, the lane change detecting unit 17 ends the present process.

At step S13, the lane change detecting unit 17 sets "lane change started". The own vehicle is in the midst of a lane change from this point until "lane change completed" is set at step S16, described hereafter.

At step S14, the condition changing unit 19 changes the reference value X used in the process at step S4 to a value, which is used when the own vehicle is in the midst of a lane change, that is greater than a value (hereinafter referred to as the normal value) which is used when the own vehicle is not in the midst of a lane change. When the reference value X increases, the state in which the displacement of the position of the travel lane marking candidate between image frames is the reference value X or lower is more easily continued. The travel lane marking probability is more easily increased. As a result, the travel lane marking candidate is more easily recognized as a travel lane marking.

Meanwhile, when determined NO at step S11, the lane change detecting unit 17 proceeds to step S15. At step S15, the lane change detecting unit 17 determines whether or not a travel lane marking has been recognized since the previous process at step S15. When determined that a travel lane marking has been recognized, the lane change detecting unit 17 proceeds to step S16. When determined that a travel lane marking has not been recognized, the lane change detecting unit 17 ends the present process.

At step S16, the lane change detecting unit 17 sets "lane change completed". After this point, the own vehicle is no longer in the midst of a lane change.

At step S17, the condition changing unit 19 resets the reference value X to the normal value.

4. Effects (1A) When the own vehicle is in the midst of a lane change, the travel lane marking recognition apparatus 1 changes the calculation condition of the travel lane marking probability to allow the travel lane marking probability to be more easily increased compared to that when the own vehicle is not in the midst of a lane change. That is, when the own vehicle is in the midst of a lane change, travel lane marking recognition apparatus 1 changes the reference value X used in the process at step S4 to the value greater than the normal value. As a result, the state in which the displacement of the position of the travel lane marking candidate between image frames is the reference value X or lower is more easily continued. The travel lane marking probability of the travel lane marking candidate is more easily increased. Consequently, the travel lane marking recognition apparatus 1 can recognize the travel lane marking at an early stage during lane change.

(1B) The travel lane marking recognition apparatus 1 sets the reference value X to the normal value when the own vehicle is not in the midst of a lane change. As a result, the travel lane marking can be recognized with high accuracy when the own vehicle is not in the midst of a lane change.

(1C) The travel lane marking recognition apparatus 1 detects that the own vehicle is in the midst of a lane change based on the distance d between the own vehicle and the travel lane marking in the vehicle width direction being the lower limit value Z or less. Therefore, the own vehicle being in the midst of a lane change can be easily and accurately detected.

(1D) After detecting that the own vehicle is in the midst of a lane change, the travel lane marking recognition apparatus 1 detects that the lane change has been completed under a condition that the travel lane marking is recognized. Therefore, the completion of a lane change can be easily and accurately detected.

Second Embodiment

1. Configuration

The travel lane marking recognition apparatus 1 according to the present embodiment has a configuration similar to that according to the above-described first embodiment.

2. Travel Lane Marking Recognition Process and Condition Change Process

The processes performed by the travel lane marking recognition apparatus 1 according to the present embodiment are basically similar to those according to the above-described first embodiment. Descriptions of shared configurations will be omitted hereafter. Differences will mainly be described.

According to the present embodiment, in the process at step S14, the threshold value Y used in the process at step S5 is set to a value, which is used when the own vehicle is in the midst of a lane change, that is smaller than a value which is used when the own vehicle is not in the midst of a lane change. As a result of the threshold value Y being made smaller, the travel lane marking candidate can be more easily recognized as a travel lane marking.

In addition, according to the present embodiment, in the process at step S17, the threshold value Y is returned to the value for when the own vehicle is not in the midst of a lane change.

According to the present embodiment, the reference value X may be fixed, regardless of whether or not the own vehicle is in the midst of a lane change. Alternatively, the value may be changed in a manner similar to that according to the first embodiment.

3. Effects

According to the present embodiment, in addition to the effects (1C) and (1D) according to the first embodiment, the following effects are achieved.

(2A) When the own vehicle is in the midst of a lane change, the travel lane marking recognition apparatus 1 changes the threshold value Y to be lower than that when the own vehicle is not in the midst of a lane change. As a result, the travel lane marking recognition apparatus 1 can recognize the travel lane marking at an early stage during a lane change.

(2B) When the own vehicle is not in the midst of a lane change, the travel lane marking recognition apparatus 1 returns the threshold value Y to that when the own vehicle is not in the midst of a lane change. As a result, the travel lane marking can be recognized with high accuracy when the own vehicle is not in the midst of a lane change.

Third Embodiment

1. Configuration

The travel lane marking recognition apparatus 1 according to the present embodiment has a configuration similar to that according to the above-described first embodiment.

2. Travel Lane Marking Recognition Process and Condition Change Process

The processes performed by the travel lane marking recognition apparatus 1 according to the present embodiment are basically similar to those according to the above-described first embodiment. Descriptions of shared configurations will be omitted hereafter. Differences will mainly be described.

According to the present embodiment, the travel lane marking probability calculated at step S4 is the degree (magnitude) of parallelism between adjacent travel lane marking candidates. In other words, in the example shown in FIG. 5, the travel lane marking probability of the travel lane marking candidate 115 increases as the parallelism with the adjacent travel lane marking candidate 117 increases. Here, parallelism is a parameter that increases as the angle formed by the travel lane marking candidate 115 and the adjacent travel lane marking candidate 117 becomes smaller.

In addition, in the process at step S5 according to the present embodiment, among the travel lane marking candidates detected at step S3, a travel lane marking candidate of which the travel lane marking probability calculated at step S4 is a threshold value Y related to parallelism or higher is recognized as the travel lane marking.

In the process at step S14 according to the present embodiment, the threshold value Y related to parallelism used in the process at step S5 is set to a value, which is used when the own vehicle is in the midst of a lane change, that is smaller than a value which is used when the own vehicle is not in the midst of a lane change. As a result of the threshold value Y being made smaller, the travel lane marking candidate can be more easily recognized as a travel lane marking.

In addition, in the process at step S17 according to the present embodiment, the threshold value Y is returned to the value for when the own vehicle is not in the midst of a lane change.

3. Effects

According to the present embodiment, the above-described effects (1C) and (1D) according to the first embodiment and the above-described effects (2A) and (2B) according to the second embodiment are achieved.

Other Embodiments (1) According to the above-described first embodiment, the reference value X may be set to be greater in the peripheral portion of the image than in the center portion of the image. In this case, the calculation condition for travel lane marking probability in the peripheral portion of the image is that which allows the travel lane marking probability to be more easily increased, compared to that in the center portion of the image.

When the own vehicle is in the midst of a lane change, the travel lane marking generally tends to appear in the peripheral portion. As described above, when the calculation condition for travel lane marking probability is set to that which allows the travel lane marking probability to be more easily increased in the peripheral portion of the image, the travel lane marking can be recognized at an early stage. In addition, the travel lane marking can be recognized with high accuracy in the center portion of the image.

The state in which the reference value X is greater in the peripheral portion of the image than in the center portion of the image may be set for only when the own vehicle is in the midst of a lane change, or may be set regardless of whether or not the own vehicle is in the midst of a lane change.

(2) According to the above-described second and third embodiments, the threshold value Y may be set to be smaller in the peripheral portion of the image than in the center portion of the image. In this case, the travel lane marking is more easily recognized in the peripheral portion of the image than in the center portion of the image.

When the own vehicle is in the midst of a lane change, the travel lane marking generally tends to appear in the peripheral portion. As described above, as a result of the travel lane marking being more easily recognized in the peripheral portion of the image, the travel lane marking can be recognized at an early stage. In addition, the travel lane marking can be recognized with high accuracy in the center portion of the image.

As described above, the state in which the threshold value Y is smaller in the peripheral of the image than in the center portion of the image may be set for only when the own vehicle is in the midst of a lane change, or may be set regardless of whether or not the own vehicle is in the midst of a lane change.

(3) In the process at step S3 according to the above-described first and second embodiments, among the straight lines obtained by Hough transform, a straight line of which the parallelism with an adjacent straight line is the threshold value Y or higher may be set as a travel lane marking candidate. A straight line of which the parallelism is less than the threshold value Y may not be set as a travel lane marking candidate.

In this case, in the process at step S14, the threshold value Y related to parallelism used in the process at step S3 is set to the value, which is used when the own vehicle is in the midst of a lane change, that is smaller than the value which is used when the own vehicle is not in the midst of a lane change. When the threshold value Y is becomes smaller, the straight line obtained by Hough transform is more easily detected as a travel lane marking candidate.

In addition, in the process at step S17, the threshold value Y related to parallelism used in the process at step S3 is returned to the value which is used when the own vehicle is not in the midst of a lane change.

According to the above-described embodiment, when the own vehicle is in the midst of a lane change, the threshold value Y becomes lower than that for when the own vehicle is not in the midst of a lane change. The travel lane marking candidate is more easily detected. As a result, the travel lane marking candidate is more easily recognized at an early stage.

In addition, when the own vehicle is not in the midst of a lane change, the threshold value Y is returned to the value for when the own vehicle is not in the midst of a lane change. As a result, when the own vehicle is not in the midst of a lane change, the travel lane marking candidate is less easily detected, and the travel lane marking can be recognized with high accuracy.

(4) According to the above-described first to third embodiments, a plurality of types of travel lane marking probability may be calculated for a single travel lane marking candidate. The calculated travel lane marking probabilities may be multiplied, and a final travel lane marking probability may be calculated. A travel lane marking candidate of which the final travel lane marking probability is the threshold value Y or higher may be recognized as a travel lane marking.

The travel lane marking probability includes, for example, the number of votes during the Hough transform process, the intensity of contrast between two sides between which the travel lane marking candidate serves as a border, the linearity of the travel lane marking candidate, and the lack of patterns in an area sandwiched between a pair of travel lane marking candidates.

(5) According to the above-described first to third embodiments, other methods may be used for the determination at step S12. For example, the travel lane marking recognition apparatus 1 may proceed to step S13 when determined that the steering angle of the own vehicle is a predetermined upper limit value or higher. The travel lane marking recognition apparatus 1 may end the process when determined that the steering angle of the own vehicle is lower than the predetermined upper limit. Alternatively, the travel lane marking recognition apparatus 1 may proceed to step S13 when determined that the yaw rate of the own vehicle is a predetermined upper limit value or higher. The travel lane marking recognition apparatus 1 may end the process when determined that the yaw rate of the own vehicle is lower than the predetermined upper limit. Still further, the travel lane marking recognition apparatus 1 may proceed to step S13 when determined that an angle formed by the advancing direction of the own vehicle and the travel lane marking is a predetermined upper limit value or higher. The travel lane marking recognition apparatus 1 may end the process when determined that the angle formed by the advancing direction of the own vehicle and the travel lane marking is lower than the predetermined upper limit.

(6) At step S4 according to the above-described first to third embodiments, the number of frames over which a state in which the shift in direction of the travel lane marking candidate between frames (the angle formed by the longitudinal directions of the travel lane marking candidates) is the reference value X or lower continues may be calculated as the consecutive number of frames. The travel lane marking probability may be set to a greater value as the number of consecutive frames increases.

(7) According to the above-described first to third embodiments, the amount of time over which the state in which the displacement of the position of the travel lane marking candidate is the reference value X or lower is continuous, from past frames to the current frame, or the travel distance of the own vehicle during the period over which the state in which the displacement of the position of the travel lane marking candidate is the reference value X or lower is continuous may be calculated. The travel lane marking probability may be set to a greater value as these values increase.

(8) A function provided by a single constituent element according to the above-described embodiments may be dispersed among a plurality of constituent elements. Functions provided by a plurality of constituent elements may be integrated in a single constituent element. In addition, at least some of the configurations according to the above-described embodiments may be replaced with publically known configurations that provide similar functions. Furthermore, at least some of the configurations according to the above-described embodiments may be omitted. Moreover, at least some of the configurations according to the above-described embodiments may, for example, be added to or substituted for a configuration according to another of the above-described embodiments. Any embodiment included in the technical concept specified only by the wordings of the claims is an embodiment of the present disclosure.

(9) The present disclosure can also be actualized by various modes in addition to the above-described travel lane marking recognition apparatus, such as a system of which a constituent element is the travel lane marking recognition apparatus, a program enabling a computer to function as the travel lane marking recognition apparatus, a recording medium on which the program is recorded, and a travel lane marking recognition method.

What is claimed is:

1. A travel lane marking recognition apparatus that is mounted to an own vehicle, the travel lane marking recognition apparatus comprising:
    an imaging unit that images an area ahead of the own vehicle to generate an image of the area;
    an edge point extracting unit that extracts edge points from the image;
    a travel lane marking candidate detecting unit that detects travel lane marking candidates based on the edge points;
    a travel lane marking probability calculating unit that calculates a travel lane marking probability of each of the travel lane marking candidates based on a predetermined calculation condition;
    a travel lane marking recognizing unit that recognizes, as a travel lane marking, a travel lane marking candidate having a travel lane marking probability that is a predetermined threshold value or higher, among the travel lane marking candidates;
    a lane change detecting unit that detects that the own vehicle is in the midst of a lane change; and
    a condition changing unit that, when the own vehicle is in the midst of a lane change, (i) changes the predetermined calculation condition of the travel lane marking probability to allow the travel lane marking probability to be more easily increased compared to that when the own vehicle is not in the midst of a lane change, or (ii) changes the threshold value to be lower than that when the own vehicle is not in the midst of a lane change.

2. The travel lane marking recognition apparatus according to claim 1, wherein
    the travel lane marking probability includes a number of frames of the image over which a state in which a displacement of a position of the travel lane marking candidate in the image is a predetermined reference value or lower is continuous, and
    when the own vehicle is in the midst of a lane change, the condition changing unit changes the predetermined threshold value for the number of frames to be lower than that when the own vehicle is not in the midst of a lane change.

3. The travel lane marking recognition apparatus according to claim 2, wherein
    the predetermined calculation condition of the travel lane marking probability is configured such that compared to the predetermined calculation condition in a center portion of the image, the predetermined calculation condition in a peripheral portion of the image allows the travel lane marking probability to be more easily increased, and
    the predetermined threshold value is configured such that the threshold value in the peripheral portion of the image is smaller than the predetermined threshold value in the center portion of the image.

4. The travel lane marking recognition apparatus according to claim 2, wherein
    the lane change detecting unit detects that the own vehicle is in the midst of a lane change based on a distance between the own vehicle and a travel lane marking in a vehicle width direction, the distance being a predetermined lower limit value or less.

5. The travel lane marking recognition apparatus according to claim 2, wherein
    the lane change detecting unit detects that the lane change has been completed under a condition that after detecting that the own vehicle is in the midst of a lane change, the travel lane marking is recognized.

6. The travel lane marking recognition apparatus according to claim 1, wherein
    the travel lane marking probability includes a number of frames of the image over which a state in which a displacement of a position of the travel lane marking candidate in the image is a predetermined reference value or lower is continuous, and
    when the own vehicle is in the midst of a lane change, the condition changing unit changes the predetermined reference value to be larger than that when the own vehicle is not in the midst of a lane change.

7. The travel lane marking recognition apparatus according to claim 6, wherein
    the predetermined calculation condition of the travel lane marking probability is configured such that compared to the predetermined calculation condition in a center portion of the image, the predetermined calculation condition in a peripheral portion of the image allows the travel lane marking probability to be more easily increased, and
    the predetermined threshold value is configured such that the threshold value in the peripheral portion of the image is smaller than the predetermined threshold value in the center portion of the image.

8. The travel lane marking recognition apparatus according to claim 6, wherein
    the lane change detecting unit detects that the own vehicle is in the midst of a lane change based on a distance between the own vehicle and a travel lane marking in a vehicle width direction, the distance being a predetermined lower limit value or less.

9. The travel lane marking recognition apparatus according to claim 6, wherein
    the lane change detecting unit detects that the lane change has been completed under a condition that after detecting that the own vehicle is in the midst of a lane change, the travel lane marking is recognized.

10. The travel lane marking recognition apparatus according to claim 1, wherein
    the travel lane marking probability includes a degree of parallelism between the lane marking candidates adjacent to each other, and
    when the own vehicle is in the midst of a lane change, the condition changing unit changes the predetermined threshold value for the parallelism to be lower than that when the own vehicle is not in the midst of a lane change.

11. The travel lane marking recognition apparatus according to claim 10, wherein
    the predetermined calculation condition of the travel lane marking probability is configured such that compared to the predetermined calculation condition in a center portion of the image, the predetermined calculation condition in a peripheral portion of the image allows the travel lane marking probability to be more easily increased, and the predetermined threshold value is configured such that the threshold value in the peripheral portion of the image is smaller than the predetermined threshold value in the center portion of the image.

12. The travel lane marking recognition apparatus according to claim 10, wherein the lane change detecting unit detects that the own vehicle is in the midst of a lane change based on a distance between the own vehicle and a travel lane marking in a vehicle width direction, the distance being a predetermined lower limit value or less.

13. The travel lane marking recognition apparatus according to claim 10, wherein the lane change detecting unit detects that the lane change has been completed under a condition that after detecting that the own vehicle is in the midst of a lane change, the travel lane marking is recognized.

14. The travel lane marking recognition apparatus according to claim 1, wherein the predetermined calculation condition of the travel lane marking probability is configured such that compared to that the predetermined calculation condition in a center portion of the image, the predetermined calculation condition in a peripheral portion of the image allows the travel lane marking probability to be more easily increased, and the predetermined threshold value is configured such that the threshold value in the peripheral portion of the image is smaller than the predetermined threshold value in the center portion of the image.

15. The travel lane marking recognition apparatus according to claim 1, wherein the lane change detecting unit detects that the own vehicle is in the midst of a lane change based on a distance between the own vehicle and a travel lane marking in a vehicle width direction, the distance being a predetermined lower limit value or less.

16. The travel lane marking recognition apparatus according to claim 1, wherein the lane change detecting unit detects that the lane change has been completed under a condition that after detecting that the own vehicle is in the midst of a lane change, the travel lane marking is recognized.

17. A travel lane marking recognition method comprising:

imaging, by the travel lane marking recognition apparatus mounted to an own vehicle, an area ahead of the own vehicle to generate an image of the area, extracting, by an edge point extracting unit of the travel lane marking recognition apparatus, edge points from the image;

detecting, by the travel lane marking recognition apparatus, travel lane marking candidates based on the edge points;

calculating, by the travel lane marking recognition apparatus, a travel lane marking probability of each of the travel lane marking candidates based on a predetermined calculation condition;

recognizing, by the travel lane marking recognition apparatus, as a travel lane marking, a travel lane marking candidate having a travel lane marking probability that is a predetermined threshold value or higher, among the travel lane marking candidates;

detecting, by the travel lane marking recognition apparatus, that the own vehicle is in the midst of a lane change; and when the own vehicle is in the midst of a lane change, (i) changing, by the travel lane marking recognition apparatus, the predetermined calculation condition of the travel lane marking probability to allow the travel lane marking probability to be more easily increased compared to that when the own vehicle is not in the midst of a lane change, or (ii) changing, by the travel lane marking recognition apparatus, the threshold value to be lower than that when the own vehicle is not in the midst of a lane change.

\* \* \* \* \*